United States Patent [19]

Maki

[11] Patent Number: 5,021,918
[45] Date of Patent: Jun. 4, 1991

[54] STATIC ELECTRICITY DISCHARGE SUPPRESSOR

[76] Inventor: Ronald L. Maki, 6156 Barman Rd., Waunakee, Wis. 53597

[21] Appl. No.: 377,560

[22] Filed: Jul. 10, 1989

[51] Int. Cl.⁵ .............................................. H05F 3/00
[52] U.S. Cl. ..................................... 361/216; 361/217; 361/220; 152/DIG. 2; 152/152.1
[58] Field of Search .................. 174/5 R, 5 SB, 5 SG, 174/51; 307/10.1; 361/212, 216, 217, 220, 221; 439/10, 11, 12, 15, 16, 17, 18, 19; 152/151, 152.1, DIG. 2; 301/6 WB

[56] References Cited

U.S. PATENT DOCUMENTS

| | | | |
|---|---|---|---|
| 1,797,545 | 3/1931 | Churcher | 361/217 |
| 2,104,800 | 1/1938 | Grandy et al. | 361/217 |
| 2,108,530 | 2/1938 | Ellis et al. | 361/217 |

Primary Examiner—A. D. Pellinen
Assistant Examiner—Peter Ganjou
Attorney, Agent, or Firm—Keith Schoff

[57] ABSTRACT

To eliminate interference with radio reception, static electricity generated by a vehicle tire during operation can be dissipated by the retrofit attachment of one end of a spring wire to the wheel hub with insertion of the other end through a vent opening in the wheel bearing cap to contact the end face of the wheel mounting spindle to provide a conductive path to the vehicle frame without dismantling of the bearing seal.

4 Claims, 2 Drawing Sheets

STATIC ELECTRICITY DISCHARGE SUPPRESSOR

FIELD OF ART

Static electricity is generated by automotive vehicle tires during operation, and causes interference with radio reception when the electrical potential is great enough to cause spark discharge and ionization of air rather than low voltage dissipation through an electrically conductive path.

BACKGROUND OF THE INVENTION

U.S. Pat. Nos. 2,104,800 and 2,108,530 disclose use of electrically conductive wires which attach, respectively, to a vehicle wheel and vehicle frame, and make sliding contact with the alternate member, as means for dissipating tire-generated, static electric charge to a vehicle frame by circumventing the non-conductive lubricant in a wheel bearing.

SUMMARY OF THE DISCLOSURE

Vehicle wheel bearings which embody oil bath lubrication are not conveniently unsealed for installation of shunt wires of the prior art. The method and means of this invention provides a spring metal shunt means which can conveniently be retro-fitted on a vehicle wheel to by-pass an oil bath lubricated wheel bearing by being attached at one end to a bearing cap retaining screw with the other end being fed through a vent opening as typically appears in the center of a bearing cap for oil bathed bearings, into contact with the end of the wheel axle spindle. A pilot hole remaining from machining of the spindle is typically present and serves to seat and center the end of the spring wire shunt end against the end of the spindle, but if a pilot hole is absent or obstructed, a bridge means is easily installed on the axle spindle nut to span the end of the spindle and provide a centering and seating depression for the spring wire. The installation is possible with any wheel, but is particularly useful on the front steering wheels of semi-trailer rig tractors with forward mounted cabs to eliminate static interference with citizen band radio aerials which are often mounted directly above the wheel, and increasingly, with satellite navigational equipment which may be mounted on the roof of the cab and with other computer driven equipment in the vehicle.

DESCRIPTION OF THE INVENTION

Figure 1:
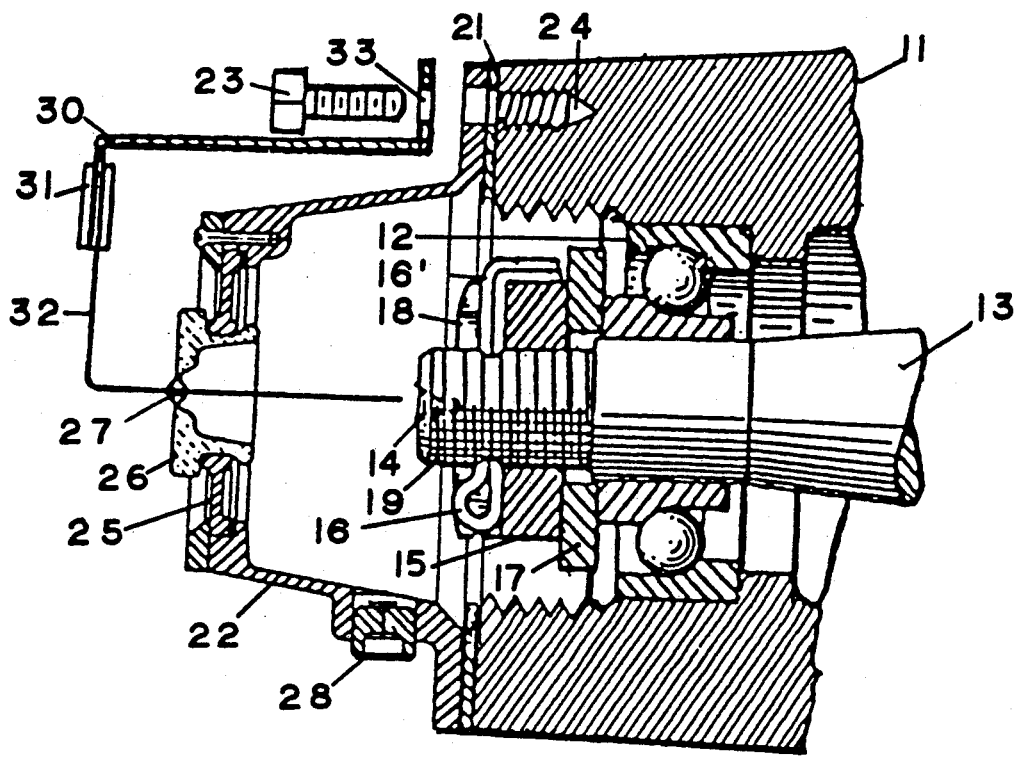
FIG. 1 is a cross-sectional elevation of a preferred embodiment of a static electricity discharge suppressor device of this invention shown juxtaposed with a portion of a wheel hub and axle assembly for installation thereon.

In FIG. 1 automotive wheel hub 11 is partially shown, in assembly with wheel bearing 12 and axle spindle 13 of a non-driven axle. Washer 17 and nut 15 secure bearing 12 on spindle 13, and cotter pin 16 is disposed in radial keyway 18 of nut 15 with the cotter pin passing through an opening extending diametrically through threaded end portion 19 of spindle 13. The tail end extremities 16' of cotter pin 16 are wrapped over a side face of nut 15 to prevent inadvertent removal of cotter pin 16 from spindle 13. Gasket 21 together with hub cap 22 are operably placed on the end face of hub 11 with cap screw 23 positioned to be inserted in tapped, blind hole 24 in hub 11 to secure hub cap 22 and gasket 21 on hub 11. Hub cap 22 is provided with clear annular sight window 25 and carries soft plastic plug 26 in the center with pressure equalizing vent 27 positioned in axial alignment with spindle 13. The sight window enables bearing lubricating oil level in the hub assembly to be visually inspected, and vent opening 27 enables pressure equalization to exist in the hub assembly with ambient atmospheric pressure. Oil fill and drain plug 28 provides access to for maintenance of lubricant for the wheel bearing. The foregoing describes conventional art and comprises no part of this invention.

Flat, spring metal band 30 is configured with opening 33 for receiving cap screw 23 therethrough for attaching band 30 to hub 11, and is further configured with angular bends which dispose the opposite end portion radially extending over a portion of the end face of hub cap 22. The latter end portion is frictionally engaged in clip 31 attached to spring wire 32 with the spring wire being bent to extend axially into contact with the end of spindle 13. Typically, a conically configured pilot hole remains in the end of spindle 13 after machining of the spindle, and the end of wire 32 is axially centered and retained in contact with the bottom of pilot hole 14 by resilient urging of band 30, when capscrew 23 is secured to hub 11. The resulting assembly provides a continuous conductive path from hub 11 to spindle 13 and ultimately to the vehicle chassis so that static electric charge which accumulates about a vehicle wheel is provided with a leakage path which enables the charge to dissipate to surroundings rather than discharge in a manner which ionizes air and interferes with radio reception and functioning of other electronic gear in the vehicle and the surrounding area.

Figure 2:
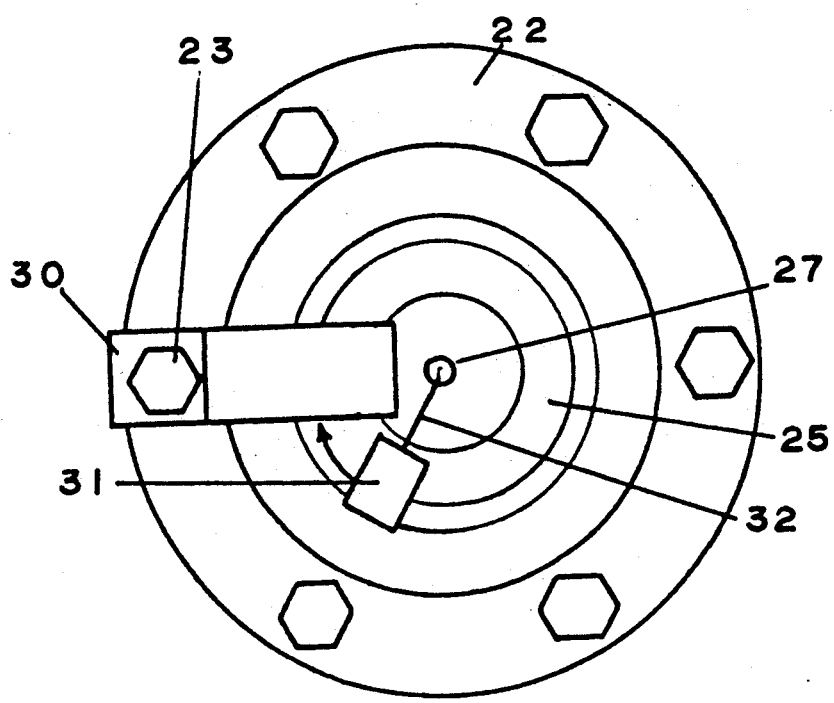
FIG. 2 is an end elevation of the assembly of FIG. 1 with the the suppressor dvice of this invention partially installed.
Figure 3:
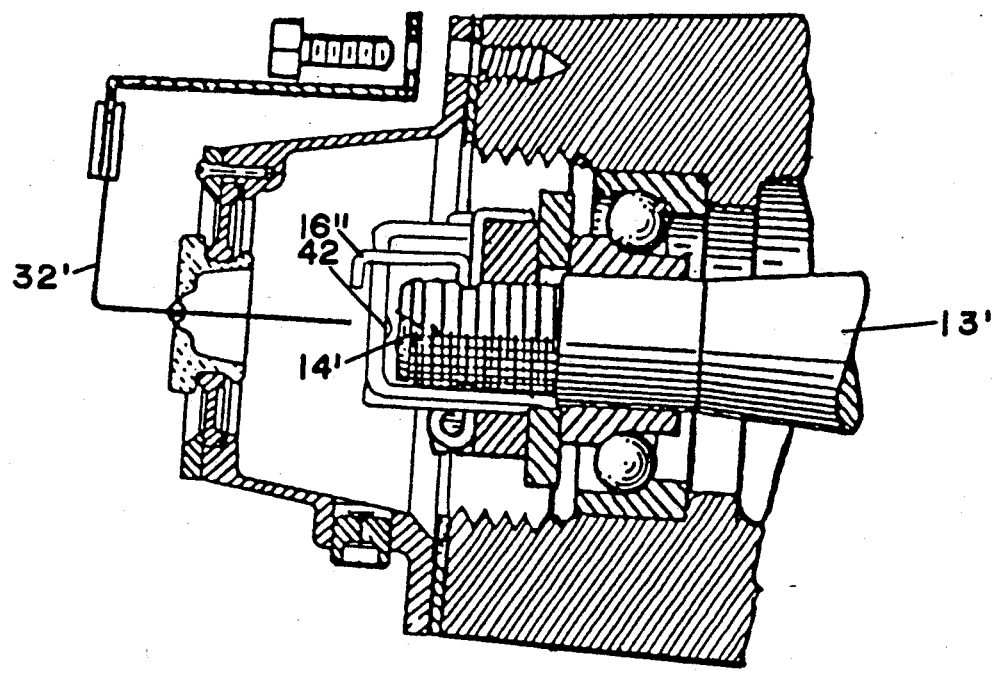
FIG. 3 is a cross-sectional elevation of another embodiment of a static electricity discharge suppressor device of this invention similar to that shown in FIG. 1 with the addition of a bridge means installed on the end of the axle assembly.
Figure 4:
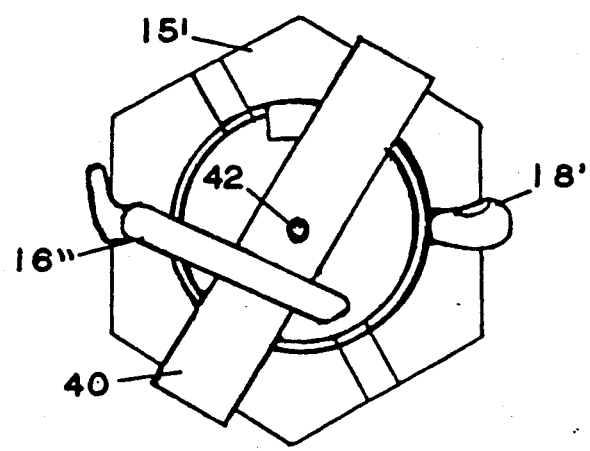
FIG. 4 is an end view of the axle assembly of FIG. 3.
Figure 5:
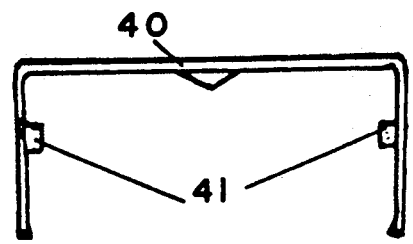
FIG. 5 is an elevation of the bridge means of FIG. 3.

In FIGS. 3, 4, and 5, a modification of the apparatus of FIGS. 1 and 2 is shown, the portrayal of FIG. 2 showing by means of an arrow the step of first positioning both band 30 and wire 32 in proper locations and trimming the wire to length before engaging clip 31, which is fixedly attached to wire 32, on band 30 so that the band and wire are frictionally retained, the modification being the supplemental use of bridge 40 to span the end of spindle 13' in instances where pilot hole 40 is absent, or obstructed by cotter pin 16, or otherwise unsuitable for receiving the end of wire 32. Bridge 40 as shown in FIG. 5 is provided with two studs 41 for being received in keyway 18' to lock the bridge in position on nut 15', and is configured with dimple 42 in axial alignment with spindle 13' for receiving and centering wire 32' in lieu of the wire extending into pilot hole 14'. Bridge 40 closely spans nut 15' and is retained seated by one tail end extremity 16" of cotter pin 16 being wrapped over the outboard face of bridge 40 thereby to maintain the bridge in stable position and electrical contact with nut 15' and spindle 13'. Similar installations can be made on each vehicle wheel, but it is of greatest importance to provide such installations on wheels in closest proximity to vehicle radio antenna or other electronic gear.

In some installations it may be necessary to slightly enlarge vent opening 27 by reaming it to assure sufficient communication of air through the vent to equalize pressure within the hub with that of ambient atmosphere when wire 32 is inserted through the opening, however, this is non-critical because lubricating oil level in the hub assembly is maintained well below axial center with only the lower portion of the bearing being oil-bathed, and loss of fluid through a slightly enlarged opening would not be a danger.

It is possible to provide an electrical path in the manner of this invention using a single wire properly bent, and other expedients will suggest themselves to persons skilled in the art, but the most accurately aligned, and convenient installation is obtained using the assembly described and shown herein.

I claim:

1. For installation on an automotive wheel hub, a static electricity discharge suppressor for eliminating interference with reception by a radio in a vehicle, an improvement comprising
   (a) an electrically conductive shunt configured to span a portion of a wheel hub assembly from a radially distant fastener on a wheel hub on which said shunt is secured outboard of said hub assembly to said wheel hub and extending along the axis of said wheel hub into contact with axle means mounting said hub, wherein said shunt passes through a hub cap confining lubricant fluid in axial extension.

2. The apparatus of claim 1 wherein said shunt comprises a separable outermost portion and innermost portion adjustably engaged.

3. The apparatus of claim 1 wherein said shunt comprises a band configured outermost portion and a wire innermost portion frictionally engaged by means of a clip means.

4. The apparatus of claim 1 wherein a bridge member is provided secured to axle means mounting said hub for making contact with said shunt.

* * * * *